G. COFFIN.
Pole and Shaft.
No. 59,970. Patented Nov. 27, 1866.
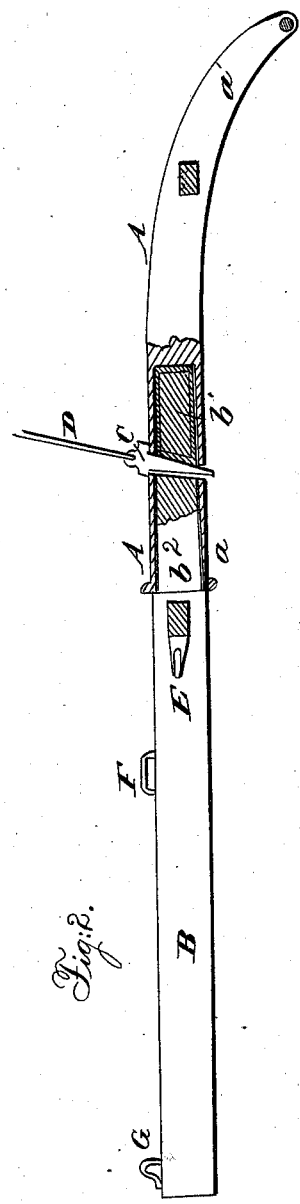
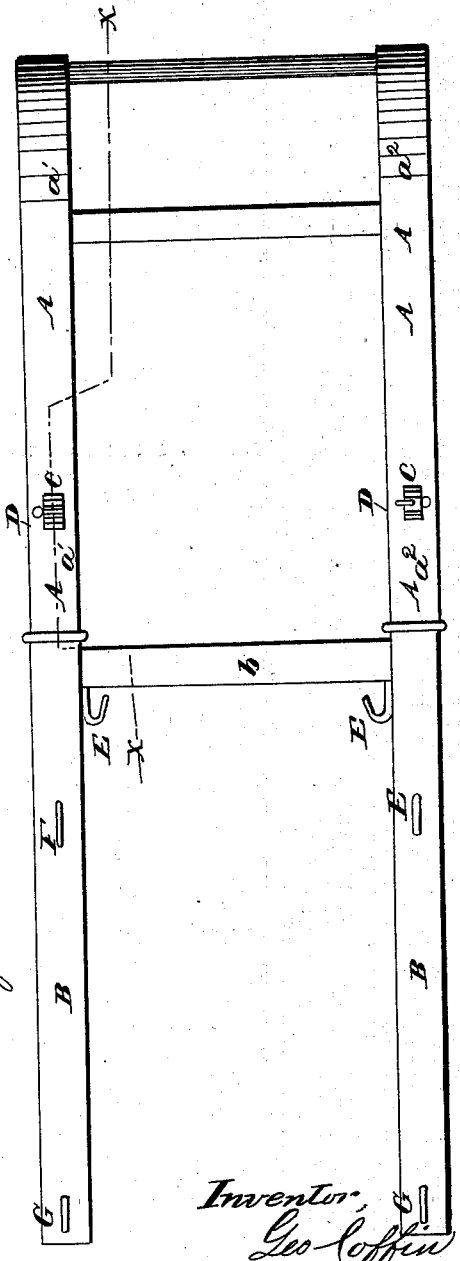

United States Patent Office.

IMPROVEMENT IN ATTACHING SHAFTS TO SLEIGHS AND CARRIAGES.

GEORGE COFFIN, OF BOSTON, MASSACHUSETTS.

Letters Patent No. 59,970, dated November 27, 1866.

SPECIFICATION.

TO ALL WHOM IT MAY CONCERN:

Be it known that I, GEORGE COFFIN, of Boston, Suffolk county, and State of Massachusetts, have invented a new and useful Improvement in Shafts for Sleighs and Carriages; and I do hereby declare that the following is a full, clear, and exact description thereof, which will enable others skilled in the art to make and use the same, reference being had to the accompanying drawing forming part of this specification, in which—

Figure 1 is a top or plan view of my improved shafts.

Figure 2 is a detail sectional view of the same, taken through the line $x$ $x$, fig. 1.

Similar letters of reference indicate like parts.

My invention has for its object to furnish an improved means for detaching the horse from the sleigh or carriage when he becomes unmanageable; and it consists in the combination of rods and keys with the parts of the shafts when said parts are constructed with tenons and sockets in the manner hereinafter more fully described.

A is the rear part of the shafts, which are curved and pivoted to the runners of the sleigh in the ordinary manner. In the forward ends of the arms, $a$ and $a^2$, of the part A, are formed square, deep sockets, as shown in fig. 2. The forward ends of the part B of the shafts are made in the usual manner, and the rear ends are connected together and held in their proper relative positions by the connecting bar $b^1$. Upon the ends of the part B of the shafts projecting in the rear of the bar $b$ are formed long square tenons, $b^2$, fitting into the sockets formed in the forward ends of the arms $a$ and $a^2$ of the part A as before described. Through the arms $a$ and $a^2$ and the tenons $b^2$ are formed holes extending from their upper to the lower sides in a slightly inclined direction, as shown in fig. 2. Into these holes are fitted the keys $c$, to the upper ends of which are attached the lower ends of the rods D, which extend upward and backward into such a position that their upper ends may be conveniently reached by the driver whenever he may desire to draw out the keys $c$ and to detach the horse. E are the trace-hooks, which may be attached to the shafts, as shown, or to a whiffletree, in the ordinary manner. F are straps, through which straps are passed that pass over the hips of the horse, and are secured to the crupper or back-strap, so that the part B of the shafts when detached may not drop against the heels of the horse but may be supported by the said straps. G are the breeching-hooks, to which the holdback-straps are attached in the ordinary manner. When my improved shafts are attached to a wagon the rear ends of the arms $a^1$ and $a^2$, of the part A, may be attached to the forward axle by means of jack-clips in the ordinary way; or the arms $a^1$ and $a^2$ may be made straight and may pass back above the forward axle and extend a few inches in its rear, being connected to the jack-clips by arms or braces. This construction I prefer, as in this case, when the part B is detached, one end of the part A will drop down and the other end will rise up with the ends of the arms on each side of the carriage body, which will guard against the fore wheels turning under the carriage body and overturning it or throwing out the occupants.

I claim as new, and desire to secure by Letters Patent—

The combination of the wedge-shaped keys C and rods D with the parts A and B of the shafts, when said parts are constructed with tenons and sockets, substantially in the manner herein described and for the purpose set forth.

GEORGE COFFIN.

Witnesses:
GILMAN DAVIS,
ALBERT DOW.